United States Patent
Ai

(10) Patent No.: US 11,458,554 B2
(45) Date of Patent: Oct. 4, 2022

(54) WIRE ELECTRICAL DISCHARGE MACHINE AND ENDFACE POSITION DETERMINING METHOD

(71) Applicant: FANUC CORPORATION, Yamanashi (JP)

(72) Inventor: Minjie Ai, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 263 days.

(21) Appl. No.: 16/826,570

(22) Filed: Mar. 23, 2020

(65) Prior Publication Data
US 2020/0306852 A1    Oct. 1, 2020

(30) Foreign Application Priority Data

Mar. 27, 2019    (JP) .............................. JP2019-060398

(51) Int. Cl.
| | |
|---|---|
| *B23H 1/02* | (2006.01) |
| *B23H 7/04* | (2006.01) |
| *B23H 7/20* | (2006.01) |
| *B23H 7/26* | (2006.01) |

(52) U.S. Cl.
CPC .............. *B23H 1/022* (2013.01); *B23H 7/04* (2013.01); *B23H 7/26* (2013.01); *B23H 2500/20* (2013.01)

(58) Field of Classification Search
CPC . B23H 1/022; B23H 7/26; B23H 7/04; B23H 7/065; B23H 2500/20; B23H 7/20
See application file for complete search history.

(56) References Cited

U.S. PATENT DOCUMENTS

| | | | |
|---|---|---|---|
| 5,170,026 | A | 12/1992 | Suga et al. |
| 5,254,826 | A | 10/1993 | Kimura et al. |
| 6,140,600 | A | 10/2000 | Kaneko et al. |
| 6,252,191 | B1 | 6/2001 | D'Amario |

(Continued)

FOREIGN PATENT DOCUMENTS

| | | |
|---|---|---|
| JP | 04-81908 | 3/1992 |
| JP | 10043951 A * | 2/1998 |

(Continued)

OTHER PUBLICATIONS

Machine translation of Japan Patent document No. 10043951A, Mar. 2022 (Year: 2022).*

*Primary Examiner* — Geoffrey S Evans
(74) *Attorney, Agent, or Firm* — Robert P. Michal, Esq.; Carter, DeLuca & Farrell LLP

(57) ABSTRACT

A wire electrical discharge machine determines the position of an endface of a workpiece by relatively moving a wire electrode toward the workpiece. The wire electrical discharge machine includes: a voltage application control unit configured to continuously apply voltage pulses between the wire electrode and the workpiece; a voltage detection unit configured to detect a voltage between the wire electrode and the workpiece; a pulse occurrence ratio calculation unit configured to calculate a pulse occurrence ratio that is a ratio of the number of the voltage pulses detected by the voltage detection unit to the number of the voltage pulses applied per a predetermined time by the voltage application control unit; and an endface position determination unit configured to determine the position of the endface of the workpiece based on the pulse occurrence ratio.

16 Claims, 6 Drawing Sheets

(56) References Cited

U.S. PATENT DOCUMENTS

| | | | | |
|---|---|---|---|---|
| 2002/0060528 A1* | 5/2002 | Murai | ................... | B23H 7/04 |
| | | | | 315/291 |
| 2004/0030440 A1* | 2/2004 | Murai | ................... | B23H 7/065 |
| | | | | 700/162 |
| 2017/0266744 A1 | 9/2017 | Sekimoto et al. | | |

FOREIGN PATENT DOCUMENTS

| | | |
|---|---|---|
| JP | 10043951 A | 2/1998 |
| JP | 3390652 | 1/2003 |
| JP | 6017096 A | 10/2016 |

\* cited by examiner

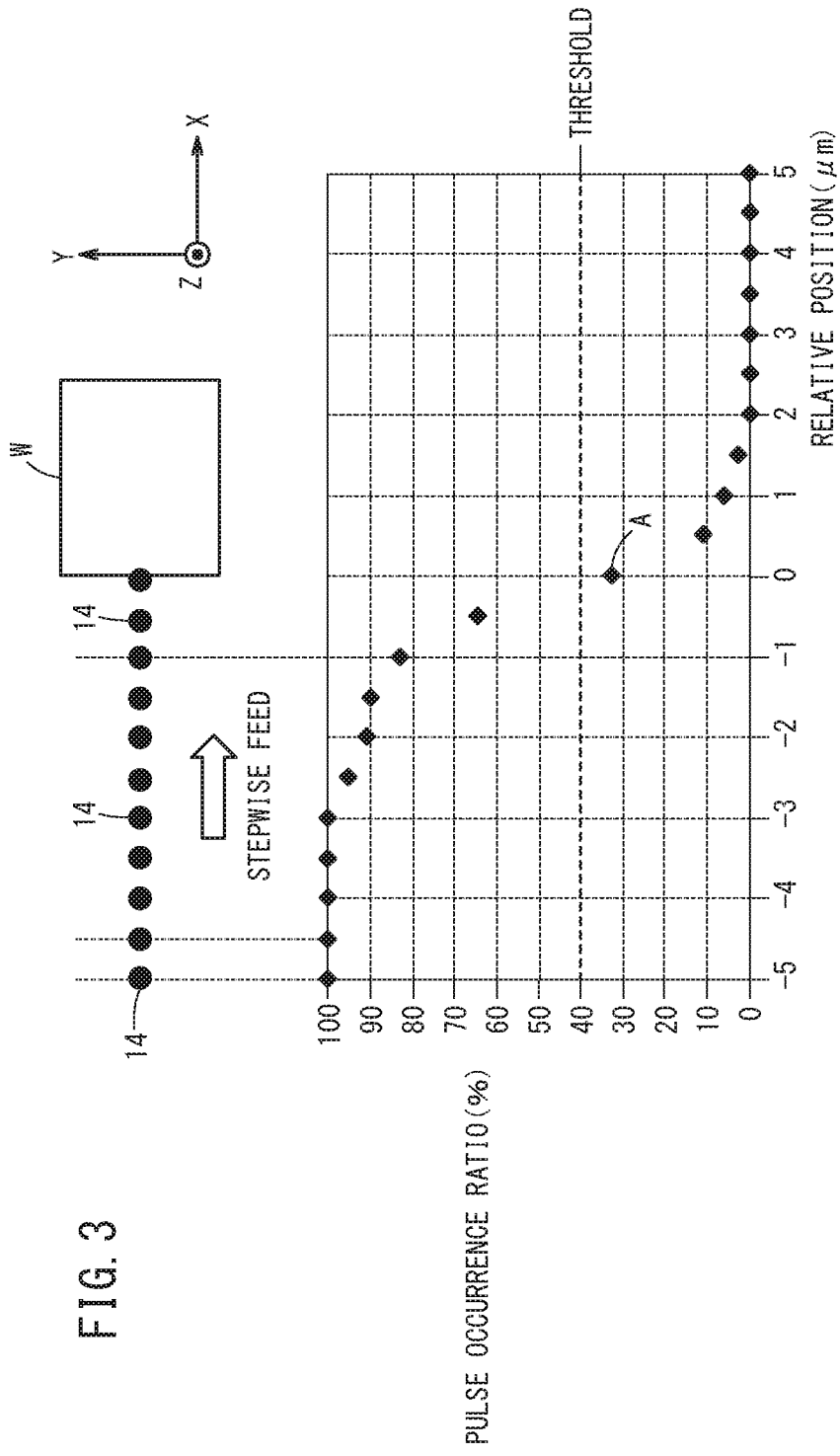

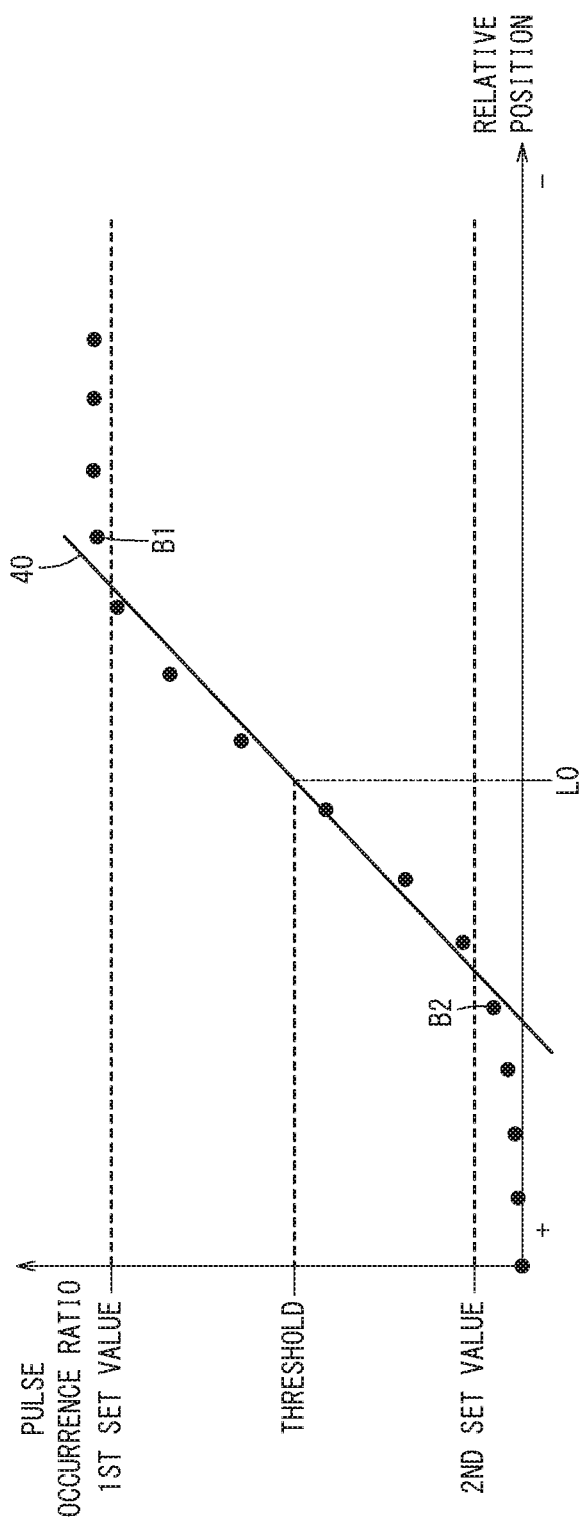

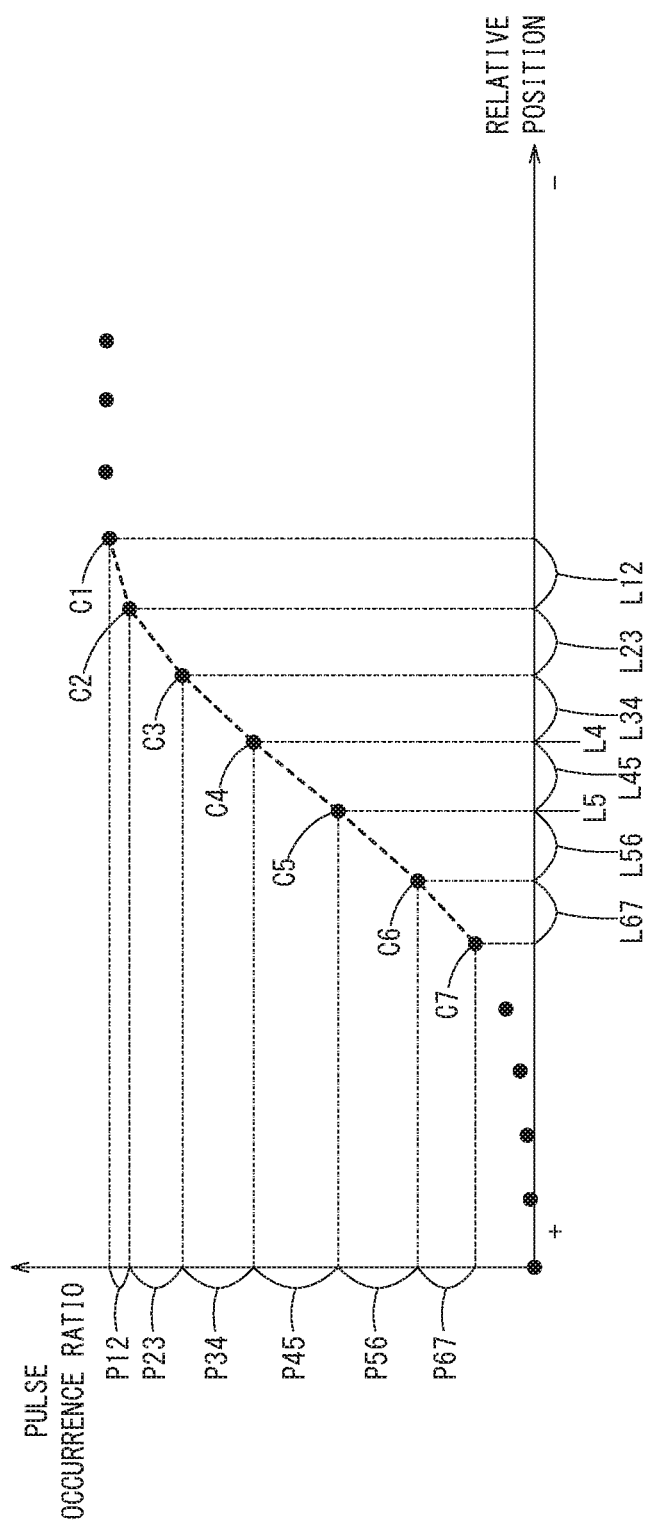

WIRE ELECTRICAL DISCHARGE MACHINE AND ENDFACE POSITION DETERMINING METHOD

CROSS-REFERENCE TO RELATED APPLICATION

This application is based upon and claims the benefit of priority from Japanese Patent Application No. 2019-060398 filed on Mar. 27, 2019, the contents of which are incorporated herein by reference.

BACKGROUND OF THE INVENTION

Field of the Invention

The present invention relates to a wire electrical discharge machine that determines the position of an endface of a workpiece as well as relating to an endface position determining method.

Description of the Related Art

Japanese Patent No. 3390652 discloses an electrical discharge machine in which, in order to perform positioning, a wire electrode is brought close to a workpiece to detect electrical contact between the two, to thereby determine the position of an endface of the workpiece.

SUMMARY OF THE INVENTION

However, if the wire electrode vibrates while the wire electrode is approaching the workpiece, the endface position of the workpiece cannot be determined correctly. Therefore, there is a problem that positioning cannot be performed with high accuracy.

It is therefore an object of the present invention to provide a wire electrical discharge machine, and an endface position determining method, capable of determining the position of an endface of a workpiece with high accuracy.

A first aspect of the present invention resides in a wire electrical discharge machine in which the position of an endface of a workpiece is determined by relatively moving a wire electrode toward the workpiece, including: a voltage application control unit configured to continuously apply voltage pulses between the wire electrode and the workpiece; a voltage detection unit configured to detect a voltage between the wire electrode and the workpiece; a pulse occurrence ratio calculation unit configured to calculate a pulse occurrence ratio that is a ratio of the number of the voltage pulses detected by the voltage detection unit to the number of the voltage pulses applied per a predetermined time by the voltage application control unit; and an endface position determination unit configured to determine the position of the endface of the workpiece based on the pulse occurrence ratio.

A second aspect of the present invention resides in an endface position determining method for a wire electrical discharge machine in which the position of an endface of a workpiece is determined by relatively moving a wire electrode toward the workpiece, including: a voltage application control step of continuously applying voltage pulses between the wire electrode and the workpiece; a voltage detection step of detecting a voltage between the wire electrode and the workpiece; a pulse occurrence ratio calculation step of calculating a pulse occurrence ratio that is a ratio of the number of the voltage pulses detected at the voltage detection step to the number of the voltage pulses applied per a predetermined time at the voltage application control step; and an endface position determination step of determining the position of the endface of the workpiece based on the pulse occurrence ratio.

According to the present invention, the endface position of a workpiece can be determined with high accuracy.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a diagram showing change in position of the wire electrode relative to a workpiece in the stepwise feed, and how the pulse occurrence ratio changes with the relative position;

FIG. 5 is a diagram showing a method of approximating the pulse occurrence ratio with an approximation function in a modified example 1; and FIG. 6 is a diagram illustrating a method of determining the position of an endface of the workpiece in a modified example 2.

DESCRIPTION OF THE PREFERRED EMBODIMENTS

A wire electrical discharge machine and an endface position determining method according to the present invention will be detailed below by describing a preferred embodiment with reference to the accompanying drawings.

Embodiment

Figure 1:
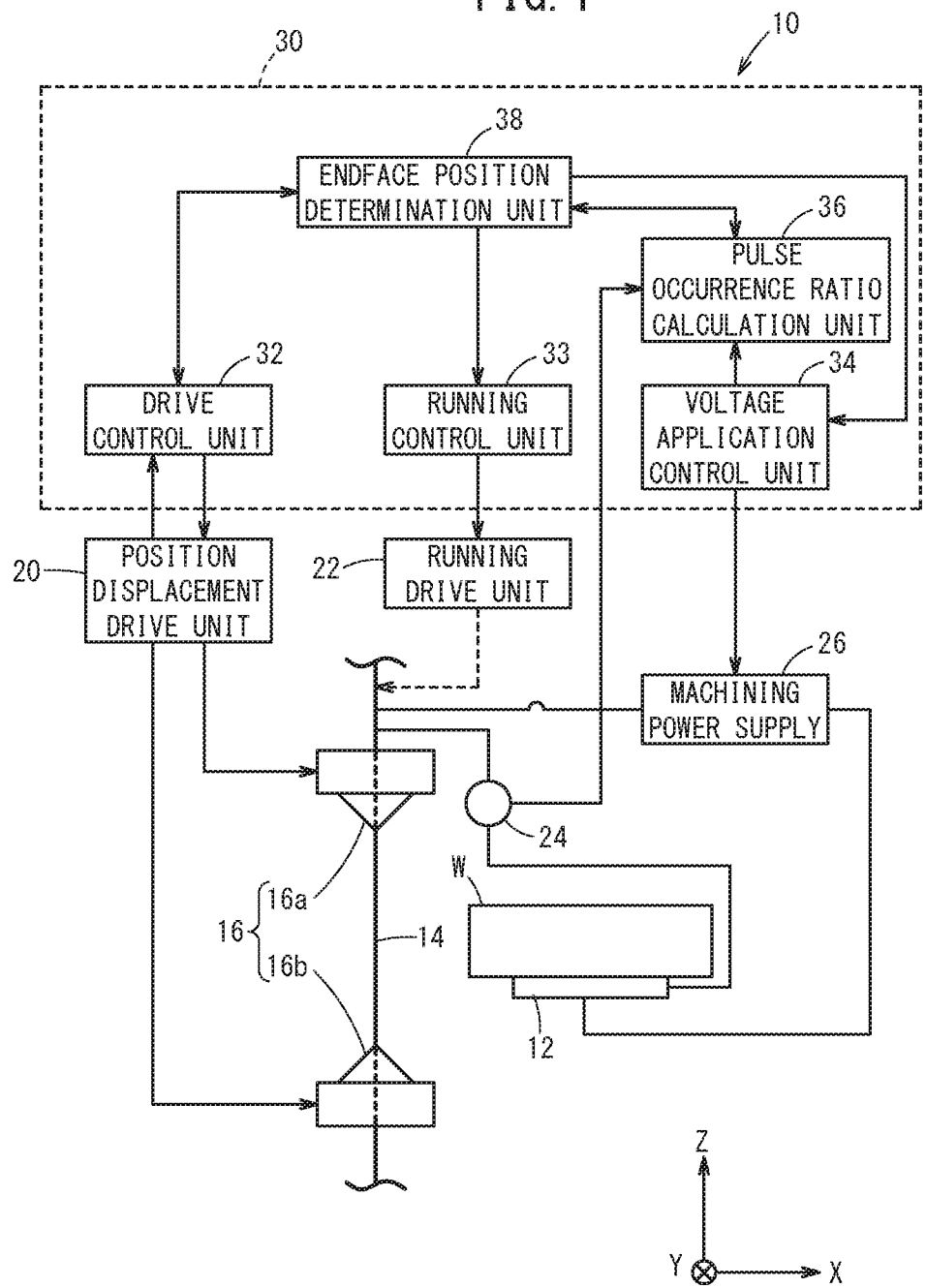
FIG. 1 is a schematic configuration diagram of a wire electrical discharge machine according to an embodiment.

FIG. 1 is a schematic configuration diagram of a wire electrical discharge machine 10 according to an embodiment. The wire electrical discharge machine 10 performs electrical discharge machining on a workpiece W supported on a table 12 by applying voltage across a gap between a wire electrode 14 and the workpiece W while moving the wire electrode 14 relatively to the workpiece W in accordance with a machining program.

As described hereinbelow, the wire electrical discharge machine 10 according to the present embodiment relatively moves the wire electrode 14 toward the workpiece W on a plane intersecting a running direction in which the wire electrode 14 is running, to thereby determine the position of an endface of the workpiece W.

The wire electrical discharge machine 10 includes an upper wire guide 16a supporting the wire electrode 14 on the upper side (on the Z-axis positive side) of the workpiece W, a lower wire guide 16b supporting the wire electrode 14 on the lower side (on the Z-axis negative side) of the workpiece W, a position displacement drive unit 20, a wire running drive unit (running drive unit) 22, a voltage detection unit 24, a machining power supply 26, and a numerical control device 30. Hereinafter, the upper wire guide 16a and the lower wire guide 16b are collectively referred to as upper and lower wire guides 16. The X, Y, and Z axes shown in FIG. 1 are orthogonal to each other. Gravity acts in the negative Z-axis direction.

The position displacement drive unit 20 moves the upper and lower wire guides 16 relative to the table 12 supporting the workpiece W. The position displacement drive unit 20 drives the upper and lower wire guides 16 in order to move the wire electrode 14 relative to the workpiece W in the X-axis and Y-axis directions.

The position displacement drive unit 20 includes motors (not shown), encoders (not shown) for detecting rotational positions of the motors, and drive transmission mechanisms (not shown). The motors are provided for moving the upper and lower wire guides 16 in the X-axis and Y-axis directions, respectively. The drive transmission mechanisms each include a ball screw, a nut, and others for converting the rotational motion of the X-direction motor or the Y-direction motor into linear motion to move the upper and lower wire guides 16 in the X-axis or Y-axis direction. In the present embodiment, the upper wire guide 16a and the lower wire guide 16b are moved so that the positions on the X-axis and the Y-axis coincide with each other. Further, the direction of the relative movement for determining the endface position of the workpiece W is defined as the X-axis direction.

It should be noted that since the upper and lower wire guides 16 only have to be moved relative to the table 12 that supports the workpiece W, the position displacement drive unit 20 may be configured to move the table 12 instead of the upper and lower wire guides 16. Alternatively, the position displacement drive unit 20 may move both the upper and lower wire guides 16 and the table 12.

The wire running drive unit 22 has a roller (not shown) for sending out the wire electrode 14 and a motor (not shown) for driving the roller, and sends out the wire electrode 14 at a predetermined speed from a wire bobbin (not shown) so that the wire electrode 14 runs between the upper wire guide 16a and the lower wire guide 16b. That is, the wire running drive unit 22 causes the wire electrode 14 to run in the Z-axis negative direction, i.e., the running direction, from the upper wire guide 16a toward the lower wire guide 16b.

The machining power supply 26 is connected to the wire electrode 14 and the table 12, and applies voltage pulses (pulse voltage) between the wire electrode 14 and the workpiece W. In the present embodiment, the voltage pulses applied between the wire electrode 14 and the workpiece W has a lower voltage than that of voltage pulses for machining, and thus does not cause any machining. The voltage detection unit 24 is connected to the wire electrode 14 and the table 12 so as to detect the voltage between the wire electrode 14 and the workpiece W.

The numerical control device 30 includes a drive control unit 32, a wire running control unit (running control unit) 33, a voltage application control unit 34, a pulse occurrence ratio calculation unit 36, and an endface position determination unit 38. The numerical control device 30 includes a processor such as a CPU and a memory, and functions as the numerical control device 30 of the present embodiment by executing a program stored in the memory. The endface position determination unit 38 performs the whole control of the endface position determining method of the present embodiment.

The drive control unit 32 performs feedback control of the motors based on the position information from the encoders of the position displacement drive unit 20 to relatively move the wire electrode 14 toward the workpiece W along a plane (XY plane) intersecting the running direction of the wire electrode 14. Specifically, the drive control unit 32, based on command signals from the endface position determination unit 38, controls the position displacement drive unit 20 so as to move the wire electrode 14 relative to the table 12 by a stepwise feed, i.e., by alternately repeating moving and stopping the upper and lower wire guides 16 toward the table 12. The stepwise feed is an operation of alternately repeating a moving state for moving forward a predetermined distance and a stopping state for remaining stationary for a predetermined stop time.

It is known that the wire electrode 14 oscillates in a direction perpendicular to the running direction as the wire runs. Therefore, in order to improve the calculation precision of the pulse occurrence ratio, which will be described later, it is desirable that the stop time in the stepwise feed is equal to or longer than the period of vibration of the wire electrode 14 that is running. The causes of the vibration of the wire electrode 14 may be, in addition to the running of the wire electrode 14, interaction with the dielectric working fluid, external vibrations, and others.

The wire running control unit 33, based on command signals from the endface position determination unit 38, causes the wire running drive unit 22 to run the wire electrode 14 in the running direction.

The voltage application control unit 34 is controlled by the endface position determination unit 38 and then controls the machining power supply 26 to continuously apply voltage pulses between the wire electrode 14 and the workpiece W.

The pulse occurrence ratio calculation unit 36 calculates the pulse occurrence ratio, i.e., the ratio of the number of voltage pulses detected by the voltage detection unit 24 to the number of voltage pulses applied between the wire electrode 14 and the workpiece W by the voltage application control unit 34 per a predetermined time while the wire electrode 14 is running in the running direction. When the stepwise feed is performed, the pulse occurrence ratio calculation unit 36 is controlled by the endface position determination unit 38 such that it calculates the pulse occurrence ratio at least during the stop time. It is preferable that the stop time is equal to or longer than the predetermined time. Note that the predetermined time is preferably equal to or longer than the period of vibration of the wire electrode 14 that is running.

The endface position determination unit 38 determines the position of an endface of the workpiece W based on the pulse occurrence ratio calculated by the pulse occurrence ratio calculation unit 36.

Figure 2A:
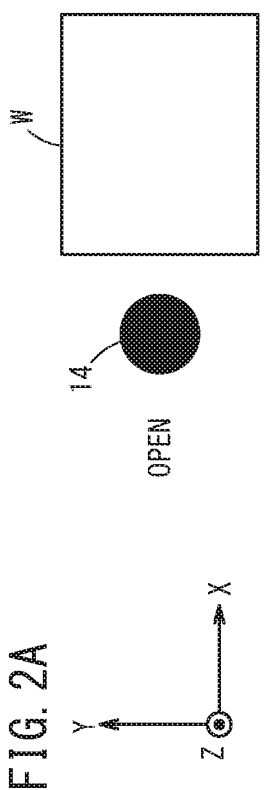
FIG. 2A is a diagram showing a relationship between the position of a wire electrode in an "open" state and the waveform of pulse voltage detected at the position.
Figure 2B:
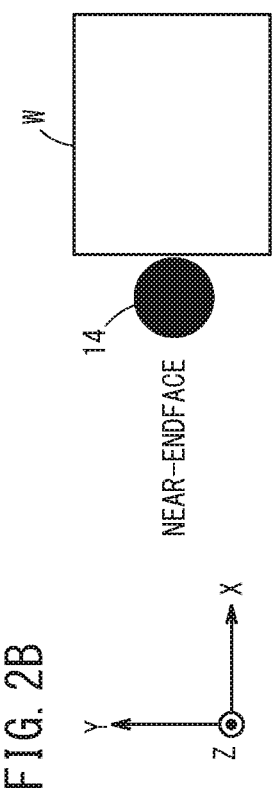
FIG. 2B is a diagram showing a relationship between the position of the wire electrode in a "near-endface" state and the waveform of pulse voltage detected at the position.
Figure 2C:
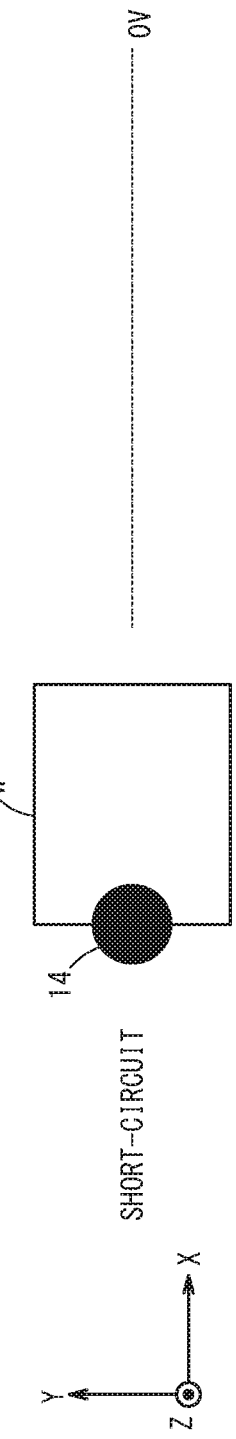
FIG. 2C is a diagram showing a relationship between the position of the wire electrode in the "short-circuited" state and the waveform of pulse voltage detected at the position.

FIGS. 2A to 2C are diagrams showing the relationship between the positions of the wire electrode 14 relative to the workpiece W and the waveforms of the pulse voltage detected at the corresponding positions. FIG. 2A is a diagram showing a relationship between the position of the wire electrode 14 in an "open" state and the waveform of the pulse voltage detected at the position. FIG. 2B is a diagram showing a relationship between the position of the wire electrode 14 in a "near-endface" state and the waveform of the pulse voltage detected according to the position. FIG. 2C is a diagram showing a relationship between the position of the wire electrode 14 in a "short circuit" state and the waveform of the pulse voltage detected at the position.

In the present embodiment, the wire electrode 14 vibrates in a direction perpendicular to the running direction, and FIGS. 2A to 2C show the center position of the vibration of the wire electrode 14. Therefore, the position of the wire electrode 14 relative to the workpiece W in FIGS. 2A to 2C may be regarded as the positions of the upper and lower wire guides 16.

As shown in FIG. 2A, in a case that the wire electrode 14 is separated from the workpiece W and they are electrically opened, even when the running wire electrode 14 is vibrating in a direction perpendicular to the running direction, the insulating state between the wire electrode 14 and the workpiece W is maintained. As a result, the voltage pulses continuously applied by the voltage application control unit 34 are detected as they are (i.e., without any change) by the voltage detection unit 24.

As shown in FIG. 2B, when the wire electrode 14 is positioned near the endface of the workpiece W, the vibration of the running wire electrode 14 causes unstable electric contact of the wire electrode 14 with the workpiece W. As a result, part of the voltage pulses continuously applied by the voltage application control unit 34 is detected by the voltage detection unit 24, that is, the voltage detection unit 24 detects voltage pulses intermittently.

As shown in FIG. 2C, when the wire electrode 14 is in complete contact with the workpiece W and they are electrically short-circuited, the voltage pulses continuously applied by the voltage application control unit 34 voltage are not detected by the voltage detection unit 24.

FIG. 3 is a diagram showing change in position of the wire electrode 14 relative to the workpiece W in the stepwise feed and how the pulse occurrence ratio changes with the relative position of the wire electrode. In the present embodiment, since the workpiece W is assumed to be fixed or secured, the relative position of the wire electrode 14 with respect to the workpiece W is the position of the wire electrode 14 on the X-axis. Each black spot shown in FIG. 3 indicates the center position in the vibration of the wire electrode 14 when movement of the upper and lower wire guides 16 toward the table 12 is stopped in the course of the stepwise feed process. Therefore, the position of the wire electrode 14 shown in FIG. 3 can be regarded as the positions of the upper and lower wire guides 16.

In the graph of the pulse occurrence ratio with respect to the relative position of the wire electrode 14 shown in FIG. 3, the vertical axis represents the pulse occurrence ratio, and the horizontal axis represents the relative position ($\mu$m). The value 0 ($\mu$m) of the relative position on the horizontal axis indicates the endface position of the workpiece W, and the positive direction is the X-axis positive direction in FIG. 1. In the above graph, as the value of the relative position changes from negative to positive by moving the wire electrode 14 (upper and lower wire guides 16) toward the workpiece W, the pulse occurrence ratio decreases from 100% to 0%.

The endface position determination unit 38 causes the drive control unit 32 to control the position displacement drive unit 20 to perform stepwise feed, and acquires the relative position of the upper and lower wire guides 16 relative to the table 12 in the stopped state (state of stopping) from the drive control unit 32. At the same time, the endface position determination unit 38 acquires the pulse occurrence ratio calculated by the pulse occurrence ratio calculation unit 36 at each stopped state. Since the offset of the position of the workpiece W with respect to the table 12 is known in advance, the endface position determination unit 38 can obtain, from the above acquired data, the relationship between the relative position of the wire electrode 14 (the relative position of the upper and lower wire guides 16) relative to the workpiece W, and the pulse occurrence ratio, shown in FIG. 3.

In FIG. 3, when the wire electrode 14 (the upper and lower wire guides 16) is moved closer to the workpiece W so that the value of the relative position increases in the positive direction, the pulse occurrence ratio becomes equal to or lower than the threshold, for the first time, at the relative position point A. The endface position determination unit 38 determines the endface position of the workpiece W based on the relative position of the point A. Herein, it is determined that the relative position of the point A is the endface position of the workpiece W, and the value is set at 0 ($\mu$m). As long as the endface position of the workpiece W is able to be determined by comparing the pulse occurrence ratio and the threshold, the relative position of a point immediately before the pulse occurrence ratio becomes equal to or lower than the threshold may be determined as the endface position of the workpiece W.

Figure 4:
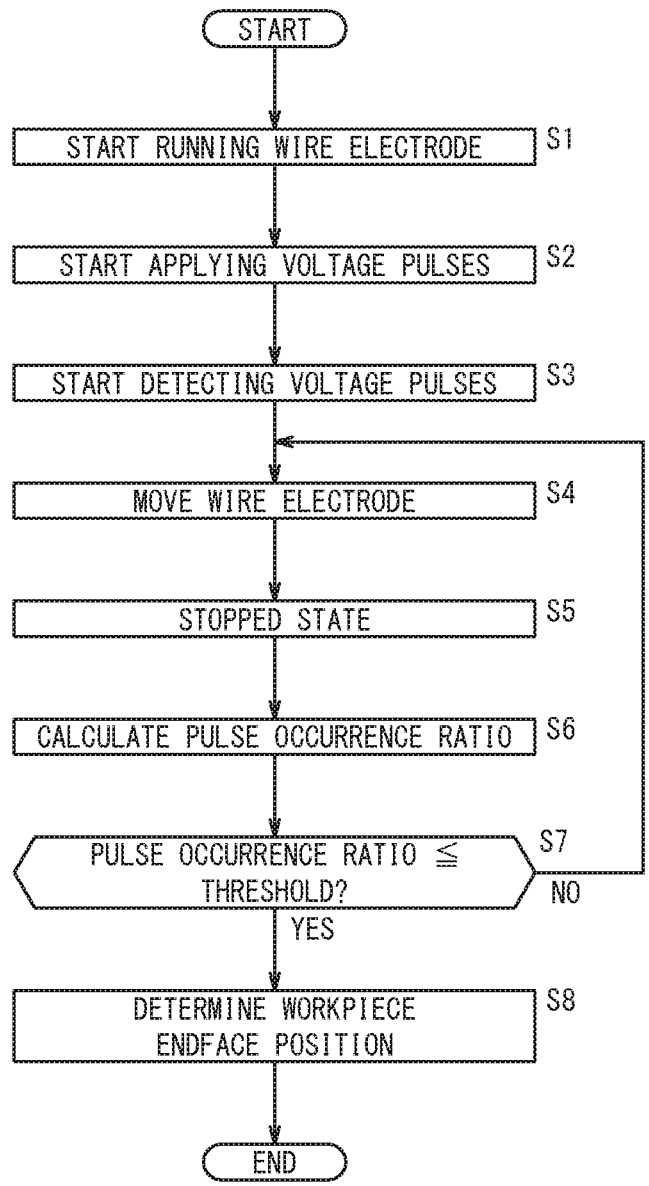
FIG. 4 is a flowchart for explaining a method of determining an endface position by stepwise feed according to the embodiment.

FIG. 4 is a flowchart for explaining a method of determining an endface position by stepwise feed according to the embodiment.

First, based on the command signal from the endface position determination unit 38, the wire running control unit 33 starts running the wire electrode 14 in the running direction (Z-axis negative direction) (step S1).

Next, the voltage application control unit 34 starts applying voltage pulses continuously between the wire electrode 14 and the workpiece W (step S2).

Then, the voltage detection unit 24 starts detecting voltage pulses between the wire electrode 14 and the workpiece W (Step S3).

Next, the drive control unit 32 moves the upper and lower wire guides 16 by a predetermined distance toward the workpiece W on the XY plane intersecting the running direction to thereby move the wire electrode 14 (Step S4).

After step S4, the drive control unit 32 stops the movement of the upper and lower wire guides 16 for the stop time to put the wire electrode in a stopped state (step S5).

Then, based on the command signal from the endface position determination unit 38, the pulse occurrence ratio calculation unit 36 calculates the pulse occurrence ratio, i.e., the ratio of the number of voltage pulses detected by voltage detection unit 24 to the number of voltage pulses applied by the voltage application control unit 34 per predetermined time during the stopped state (step S6).

After step S6, the endface position determination unit 38 determines whether or not the pulse occurrence ratio calculated by the pulse occurrence ratio calculation unit 36 at step S6 is equal to or smaller than a threshold (step S7). If the pulse occurrence ratio is greater than the threshold (step S7:NO), the control returns to step S4. If the pulse occurrence ratio is equal to or less than the threshold (step S7:YES), the control goes to step S8.

Then, the endface position determination unit 38 determines the endface position of the workpiece W based on the relative position of the wire electrode 14 (upper and lower wire guides 16) relative to the workpiece W (table 12) when the pulse occurrence ratio has become equal to or smaller than the threshold (step S8).

As described above, according to the wire electrical discharge machine 10, the position of an endface of the workpiece W is determined based on the pulse occurrence ratio. Therefore, even if the wire electrode 14 approaches the endface of the workpiece W in a vibrating state, thereby causing unstable electrical contact with the workpiece W, the endface position of the workpiece W can be determined with a high degree of accuracy.

Also, while the upper and lower wire guides 16 are relatively moved stepwise toward the table 12, the pulse occurrence ratios are calculated when the relative movement is stopped. As a result, it is possible to improve calculation accuracy of each pulse occurrence ratio. Further, by maintaining the stopped state for a time equal to or longer than the period of vibration of the running wire electrode 14 so as to calculate the pulse occurrence ratio with higher statistical accuracy, the endface position of the workpiece W can be calculated more precisely.

In the above explanation with the flowchart of FIG. 4, the voltage application control unit 34 applies voltage pulses even in the moving state of the stepwise feed.

However, the control unit 34 continuously applies voltage pulses only during the stop time in the stopped state of the stepwise feed, not apply the pulses in the moving state, and under such a condition also, the pulse occurrence ratio calculation unit 36 can calculate the pulse occurrence ratio.

In the above embodiment, the pulse occurrence ratio calculation unit 36 calculates the pulse occurrence ratio while the wire electrode 14 is being run in the running direction (Z-axis negative direction). However, the pulse occurrence ratio calculation unit 36 may calculate the pulse occurrence ratio without running the wire electrode 14.

MODIFIED EXAMPLES

The above embodiment may be modified as follows.

Modified Example 1

FIG. 5 is a diagram showing a method of approximating the pulse occurrence ratio with an approximation function in a modified example 1. FIG. 5 shows a relationship between the relative position of the wire electrode 14 (upper and lower wire guides 16) to the workpiece W (table 12) and the pulse occurrence ratio. The vertical axis represents the pulse occurrence ratio, and the horizontal axis represents the relative position of the wire electrode 14 to the workpiece W, wherein on the horizontal axis, a direction in which the value becomes positive corresponds to the X-axis positive direction in FIG. 1. Each of the black dots indicates data of the pulse occurrence ratio acquired at each relative position by the endface position determination unit 38 when relative movement is stopped during stepwise feed.

In the above embodiment, the endface position of the workpiece W is determined based on the data of the pulse occurrence ratio acquired at a finite number of relative positions by the endface position determination unit 38 when relative movement is stopped during stepwise feed. In the modified example 1, the finite number of data are approximated by an approximation function. That is, as shown in FIG. 5, the relationship between the pulse occurrence ratio and the position of the upper and lower wire guides 16 relative to the table 12 is approximated by an approximation function 40 having the relative position as a variable.

The approximation function 40 may be a straight line (linear function), a curve (quadratic or higher order function), or other function, and should not be limited. In order to improve approximation accuracy, only the data at points from a point B1 that is obtained immediately before the pulse occurrence ratio becomes smaller than a first set value to a point B2 that is obtained immediately after the pulse occurrence ratio becomes smaller than a second set value, may be used for approximating the relationship by an approximation function using the least squares method. Note that the first set value is set at a value greater than a threshold used below, and the second set value is set to a value smaller than the threshold.

Then, the endface position of the workpiece W is determined based on a relative position L0 at which the value of the approximation function 40 becomes equal to a threshold. For example, the endface position determination unit 38 determines the relative position L0 as the endface position of the workpiece W. Since the endface position determination unit 38 approximates the relationship between a finite number of obtained data by the approximation function 40 and determines the endface position of the workpiece W based on the threshold, it is possible to determine the endface position of the workpiece W with higher precision.

Modified Example 2

FIG. 6 is a diagram for explaining a method of determining the position of an endface of the workpiece W in a second modified example. In the above embodiment, the endface position determination unit 38 determines the endface position of the workpiece W by comparing the pulse occurrence ratio with a threshold. However, the endface position of the workpiece W may be determined by calculating a ratio of the difference in the pulse occurrence ratio between two successive stopped states (two successive states of stopping) in the stepwise feed, to the change in the relative position between the two successive stopped states in the stepwise feed, and comparing the resultant ratio with a threshold in magnitude.

In FIG. 6, the vertical and horizontal axes and the black dots showing the data indicating the pulse occurrence ratio at each relative position are the same as those in FIG. 5. Points C1, . . . , C7 are data representing the pulse occurrence ratios sequentially obtained at the relative position in each stopped state as the upper and lower wire guides 16 (wire electrodes 14) are moved closer stepwise to the workpiece W. For the sequentially obtained points C1, . . . , C7, the endface position determination unit 38 sequentially calculates differences P12 to P67 in the pulse occurrence ratio, changes L12 to L67 in the relative position by stepwise feed, and ratios R12 to R67 of the difference in the pulse occurrence ratio to the change in the relative position. The ratios R12 to R67 are the slopes of line segments connecting adjacent data. Specifically, the ratios are calculated, such as, R12=P12/L12, R23=P23/L23, and so on. Note that P12 to P67 are negative values, and L12 to L67 are predetermined moving distances for stepwise feed, which are positive, so that the ratios R12 to R67 result in negative values. As described below, the endface position determination unit 38 quits acquisition of the data on the pulse occurrence ratio and the relative position when the endface position of the workpiece W is determined.

The endface position determination unit 38 compares the sequentially calculated ratios R12, R23, . . . , with a threshold R in magnitude. If, for example, the ratios R12 to R34 are greater than the threshold R, and the ratio R45 becomes smaller than the threshold R, i.e., if the magnitude relationship changes, the endface position determination unit 38 determines the value L4 of the relative position at the point C4 or the value L5 of the relative position at the point C5, which are the data points used for calculation of the ratio R45, as the endface position of the workpiece W. Here, the average of the value L4 and the value L5, or a value internally divided by an arbitrary ratio, may be determined as the endface position of the workpiece W.

Instead of calculating the ratios sequentially to determine the endface position using the threshold R as described above, it is possible to first calculate all the ratios R12 to R67 and then determine the endface position of the workpiece W, using the values of the relative positions of the successive two points used for calculation of a ratio that represents the minimum value, among the ratios R12 to R67 representing the slope between the two obtained data.

Modified Example 3

Though in the above embodiment the position displacement drive unit 20 is configured to move the upper and lower wire guides 16 stepwise toward the table 12, the drive unit may be configured to perform relative movement continuously at very slow feed rate, instead of stepwise feed. In this case, while the position displacement drive unit 20 performs continuous relative movement, the voltage application control unit 34 applies voltage pulses continuously and the voltage detection unit 24 detects pulse voltages, at the same time, the pulse occurrence ratio calculation unit 36 calculates a pulse occurrence ratio for every predetermined period of time. Then, the endface position determination unit 38 determines the endface position of the workpiece W based on the calculated pulse occurrence ratios.

Modified Example 4

The above embodiment and modified examples 1 to 3 may be arbitrarily combined as long as no technical inconsistency occurs.

Invention Obtained from the Embodiment

The invention that can be grasped from the above embodiment is described below.

First Invention

A wire electrical discharge machine (10) is configured such that the position of an endface of a workpiece (W) is determined by relatively moving a wire electrode (14) toward the workpiece (W). The wire electrical discharge machine (10) includes: a voltage application control unit (34) configured to continuously apply voltage pulses between the wire electrode (14) and the workpiece (W); a voltage detection unit (24) configured to detect a voltage between the wire electrode (14) and the workpiece (W); a pulse occurrence ratio calculation unit (36) configured to calculate a pulse occurrence ratio that is a ratio of the number of the voltage pulses detected by the voltage detection unit (24) to the number of the voltage pulses applied per a predetermined time by the voltage application control unit (34); and an endface position determination unit (38) configured to determine the position of the endface of the workpiece (W) based on the pulse occurrence ratio.

With the above configuration, it is possible to determine the endface position of the workpiece (W) with high accuracy.

The wire electrical discharge machine (10) may further includes: an upper wire guide (16a) configured to support the wire electrode (14) above the workpiece (W); a lower wire guide (16b) configured to support the wire electrode (14) below the workpiece (W); and a position displacement drive unit (20) configured to relatively move the upper wire guide (16a) and the lower wire guide (16b) relative to a table (12) configured to support the workpiece (W).

The position displacement drive unit (20) may be configured to relatively move the upper wire guide (16a) and the lower wire guide (16b) toward the table (12) by stepwise feed configured to alternately repeat moving and stopping. The pulse occurrence ratio calculation unit (36) may be configured to calculate the pulse occurrence ratio in a state of the stopping. With this configuration, the calculation accuracy of the pulse occurrence ratio can be improved.

The position displacement drive unit (20) may be configured to keep the state of the stopping for a time equal to or longer than the period of vibration of the wire electrode (14) that is running. This makes it possible to determine the endface position of the workpiece (W) with higher accuracy.

The endface position determination unit (38) may be configured to determine the endface position of the workpiece (W) based on the relative position of the upper wire guide (16a) and the lower wire guide (16b) relative to the table (12), obtained at a time when the pulse occurrence ratio becomes equal to or lower than a threshold.

The endface position determination unit (38) may be configured to approximate the relation between the pulse occurrence ratio and the relative position of the upper wire guide (16a) and the lower wire guide (16b) relative to the table (12) by an approximation function (40) having the relative position as a variable, and determine the endface position of the workpiece (W) based on the relative position at which the value of the approximation function (40) coincides with a threshold. This makes it possible to determine the endface position of the workpiece (W) with higher accuracy.

The endface position determination unit (38) may be configured to determine the endface position of the workpiece (W), by comparing, in magnitude, a ratio of the difference in the pulse occurrence ratio between two successive states of the stopping in the stepwise feed, to the change in the relative position between the two successive states of the stopping in the stepwise feed, with a threshold.

The voltage application control unit (34) may be configured not to apply the voltage pulses when the upper wire guide (16a) and the lower wire guide (16b) are moving toward the table (12), but configured to apply the voltage pulses continuously in the state of the stopping.

Second Invention

An endface position determining method for a wire electrical discharge machine (10) determines the position of an endface of a workpiece (W) by relatively moving a wire electrode (14) toward the workpiece (W). The endface position determining method includes: a voltage application control step of continuously applying voltage pulses between the wire electrode (14) and the workpiece (W); a voltage detection step of detecting a voltage between the wire electrode (14) and the workpiece (W); a pulse occurrence ratio calculation step of calculating a pulse occurrence ratio that is a ratio of the number of the voltage pulses detected at the voltage detection step to the number of the voltage pulses applied per a predetermined time at the voltage application control step; and an endface position determination step of determining the position of the endface of the workpiece (W) based on the pulse occurrence ratio.

With the above configuration, it is possible to determine the endface position of the workpiece (W) with high accuracy.

The wire electrical discharge machine (10) may further include: an upper wire guide (16a) configured to support the wire electrode (14) above the workpiece (W); and a lower wire guide (16b) configured to support the wire electrode (14) below the workpiece (W). The endface position determining method may further include a position displacement drive step of relatively moving the upper wire guide (16a) and the lower wire guide (16b) relative to a table (12) configured to support the workpiece (W).

The position displacement drive step may relatively move the upper wire guide (16a) and the lower wire guide (16b) toward the table (12) by stepwise feed configured to alternately repeat moving and stopping. The pulse occurrence ratio calculation step may calculate the pulse occurrence ratio in a state of the stopping. With this configuration, the calculation accuracy of the pulse occurrence ratio can be improved.

The position displacement drive step may keep the state of the stopping for a time equal to or longer than the period of vibration of the wire electrode (14) that is running. This makes it possible to determine the endface position of the workpiece (W) with higher accuracy.

The endface position determination step may determine the endface position of the workpiece (W) based on the relative position of the upper wire guide (16a) and the lower wire guide (16b) relative to the table (12), obtained at a time when the pulse occurrence ratio becomes equal to or lower than a threshold.

The endface position determination step may approximate the relation between the pulse occurrence ratio and the relative position of the upper wire guide (16a) and the lower wire guide (16b) relative to the table (12) by an approximation function (40) having the relative position as a variable, and determine the endface position of the workpiece (W) based on the relative position at which the value of the approximation function (40) coincides with a threshold. This makes it possible to determine the endface position of the workpiece (W) with higher accuracy.

The endface position determination step may determine the endface position of the workpiece (W), by comparing, in magnitude, a ratio of the difference in the pulse occurrence ratio between two successive states of the stopping in the stepwise feed, to the change in the relative position between the two successive states of the stopping in the stepwise feed, with a threshold.

The voltage application control step does not apply the voltage pulses when the upper wire guide (16a) and the lower wire guide (16b) are moving toward the table (12), but may apply the voltage pulses continuously in the state of the stopping.

The present invention is not particularly limited to the embodiments described above, and various modifications are possible without departing from the essence and gist of the present invention.

What is claimed is:

1. A wire electrical discharge machine in which a position of an endface of a workpiece is determined by relatively moving a wire electrode toward the workpiece, comprising:
    a processor;
    a memory having stored therein instructions, which when executed by the processor, cause the wire electrical discharge machine to:
        continuously apply voltage pulses between the wire electrode and the workpiece;
        receive a detected voltage between the wire electrode and the workpiece;
        calculate a pulse occurrence ratio, the pulse occurrence ration being a ratio of a number of the voltage pulses detected to a number of the voltage pulses applied per a predetermined time; and
        determine the position of the endface of the workpiece based on the pulse occurrence ratio;
    an upper wire guide configured to support the wire electrode above the workpiece; and
    a lower wire guide configured to support the wire electrode below the workpiece, the workpiece being configured to be supported by a table;
    the processor being further configured to relatively move the upper wire guide and the lower wire guide toward the table by stepwise feed configured to alternately repeat moving and stopping, wherein the pulse occurrence ratio is calculated in a state of the stopping.

2. The wire electrical discharge machine according to claim 1, wherein the processor is further configured to keep the state of the stopping for a time equal to or longer than a period of vibration of the wire electrode that is running.

3. The wire electrical discharge machine according to claim 2, wherein the processor is further configured to determine the position of the endface of the workpiece, by comparing, in magnitude, a ratio of a difference in the pulse occurrence ratio between two successive states of the stopping in the stepwise feed, to a change in relative position between the two successive states of the stopping in the stepwise feed, with a threshold.

4. The wire electrical discharge machine according to claim 2, wherein the processor is further configured not to apply the voltage pulses when the upper wire guide and the lower wire guide are moving toward the table, but configured to apply the voltage pulses continuously in the state of the stopping.

5. The wire electrical discharge machine according to claim 1, wherein the processor is further configured to determine the position of the endface of the workpiece based on relative position of the upper wire guide and the lower wire guide relative to the table, obtained at a time when the pulse occurrence ratio becomes equal to or lower than a threshold.

6. The wire electrical discharge machine according to claim 1, wherein the processor is further configured to approximate a relation between the pulse occurrence ratio and relative position of the upper wire guide and the lower wire guide relative to the table by an approximation function having the relative position as a variable, and determine the position of the endface of the workpiece based on the relative position at which a value of the approximation function coincides with a threshold.

7. The wire electrical discharge machine according to claim 1, wherein the processor is further configured to determine the position of the endface of the workpiece, by comparing, in magnitude, a ratio of a difference in the pulse occurrence ratio between two successive states of the stopping in the stepwise feed, to a change in relative position between the two successive states of the stopping in the stepwise feed, with a threshold.

8. The wire electrical discharge machine according to claim 1, wherein the processor is further configured not to apply the voltage pulses when the upper wire guide and the lower wire guide are moving toward the table, but configured to apply the voltage pulses continuously in the state of the stopping.

9. An endface position determining method for a wire electrical discharge machine in which a position of an endface of a workpiece is determined by relatively moving a wire electrode toward the workpiece, comprising:

- continuously applying voltage pulses between the wire electrode and the workpiece;
- detecting a voltage between the wire electrode and the workpiece;
- calculating a pulse occurrence ratio, the pulse occurrence ration being a ratio of a number of the voltage pulses detected to a number of the voltage pulses applied per a predetermined time; and
- determining the position of the endface of the workpiece based on the pulse occurrence ratio, wherein the wire electrical discharge machine further includes an upper wire guide configured to support the wire electrode above the workpiece, and a lower wire guide configured to support the wire electrode below the workpiece, the workpiece being configured to be supported by a table,
- the method further comprising relatively moving the upper wire guide and the lower wire guide toward the table by stepwise feed configured to alternately repeat moving and stopping, wherein the pulse occurrence ratio is calculated in a state of the stopping.

10. The endface position determining method according to claim 9, further comprising keeping the state of the stopping for a time equal to or longer than a period of vibration of the wire electrode that is running.

11. The endface position determining method according to claim 10, further comprising determining the position of the endface of the workpiece, by comparing, in magnitude, a ratio of a difference in the pulse occurrence ratio between two successive states of the stopping in the stepwise feed, to a change in relative position between the two successive states of the stopping in the stepwise feed, with a threshold.

12. The endface position determining method according to claim 10, further comprising not applying the voltage pulses when the upper wire guide and the lower wire guide are moving toward the table, but applying the voltage pulses continuously in the state of the stopping.

13. The endface position determining method according to claim 9, wherein the position of the endface of the workpiece is determined based on relative position of the upper wire guide and the lower wire guide relative to the table, obtained at a time when the pulse occurrence ratio becomes equal to or lower than a threshold.

14. The endface position determining method according to claim 9, further comprising:

- approximating relation between the pulse occurrence ratio and relative position of the upper wire guide and the lower wire guide relative to the table by an approximation function having the relative position as a variable; and
- determining the position of the endface of the workpiece based on the relative position at which a value of the approximation function coincides with a threshold.

15. The endface position determining method according to claim 9, further comprising determining the position of the endface of the workpiece, by comparing, in magnitude, a ratio of a difference in the pulse occurrence ratio between two successive states of the stopping in the stepwise feed, to a change in relative position between the two successive states of the stopping in the stepwise feed, with a threshold.

16. The endface position determining method according to claim 9, further comprising not applying the voltage pulses when the upper wire guide and the lower wire guide are moving toward the table, but applying the voltage pulses continuously in the state of the stopping.

\* \* \* \* \*